Nov. 25, 1969

C. B. WATTS, JR 3,480,886

SCANNING APPARATUS COMPRISING PARALLEL
CONDUCTOR TRANSMISSION LINE MEANS

Filed March 16, 1967

INVENTOR
CHESTER B. WATTS JR.

BY,
*Wolf, Greenfield & Hicken*

ATTORNEYS

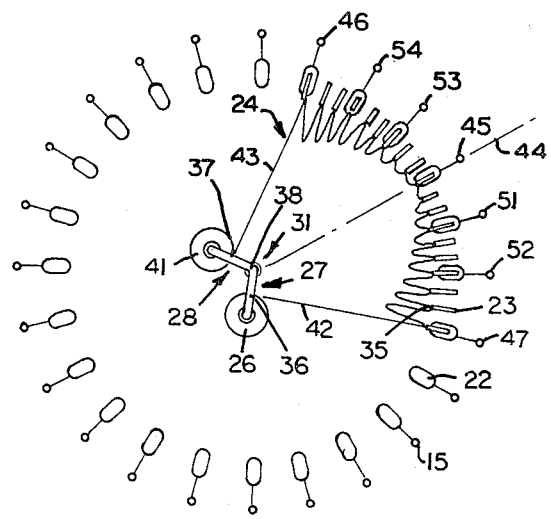
FIG. 3
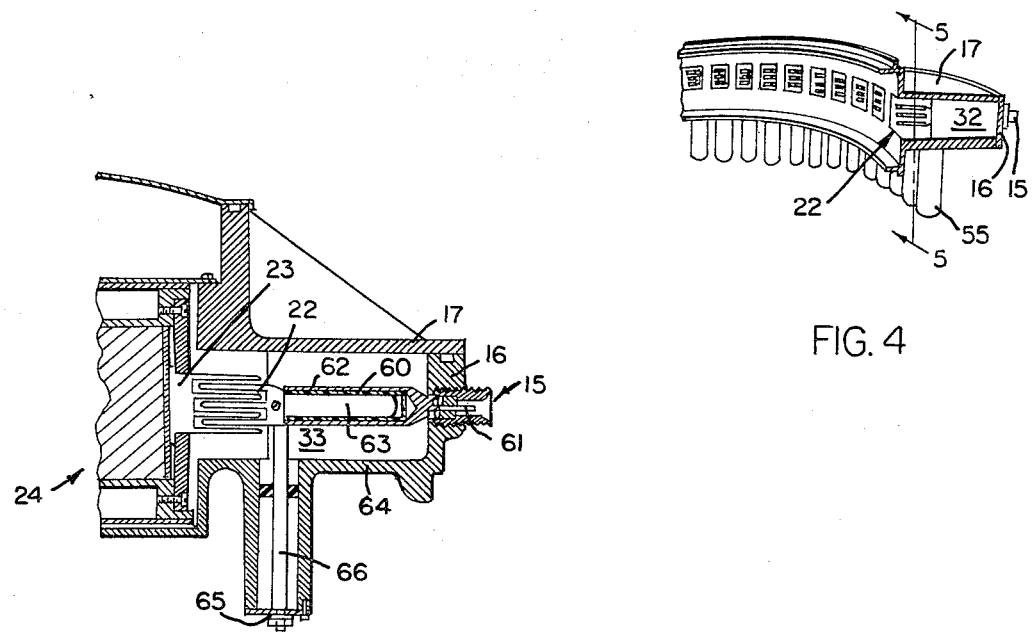
FIG. 4
FIG. 5
INVENTOR.
CHESTER B. WATTS JR.
BY
Wolf, Greenfield & Hicken
ATTORNEYS

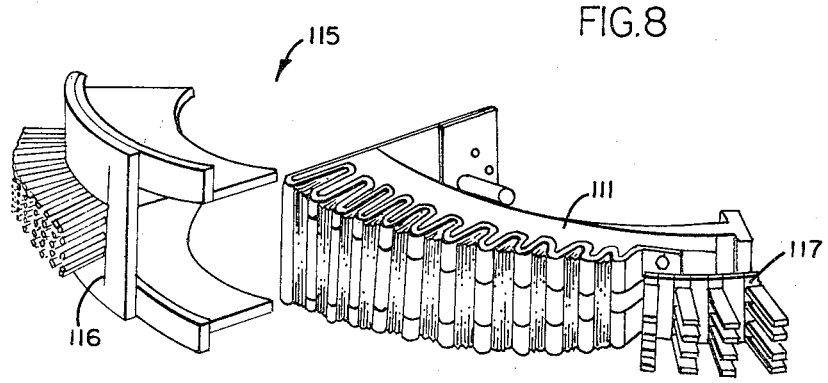
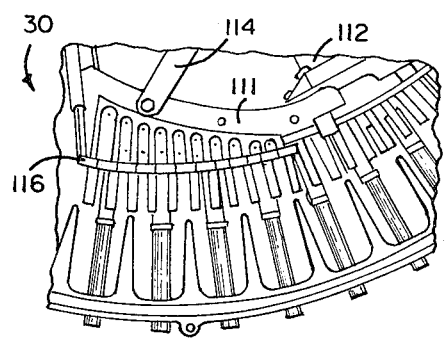
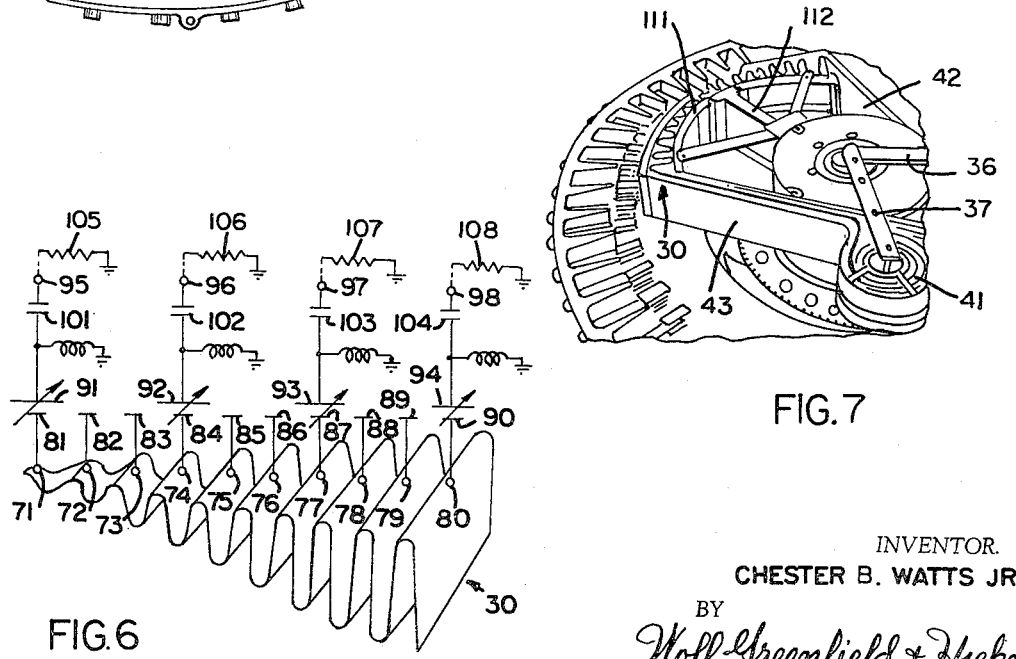

Nov. 25, 1969  C. B. WATTS, JR  3,480,886
SCANNING APPARATUS COMPRISING PARALLEL
CONDUCTOR TRANSMISSION LINE MEANS
Filed March 16, 1967  5 Sheets-Sheet 5

INVENTOR
CHESTER B. WATTS JR.
BY,
Wolf, Greenfield + Hieken
ATTORNEYS

United States Patent Office 3,480,886
Patented Nov. 25, 1969

3,480,886
SCANNING APPARATUS COMPRISING PARALLEL CONDUCTOR TRANSMISSION LINE MEANS
Chester B. Watts, Jr., Annandale, Va., assignor to Andrew Alford, Winchester, Mass.
Filed Mar. 16, 1967, Ser. No. 623,630
Int. Cl. H01p 5/12
U.S. Cl. 333—7               17 Claims

ABSTRACT OF THE DISCLOSURE

A scanner has a number of fixed terminals spaced about the circumference of a circle that are scanned by a rotor arranged to exchange energy with a selected contiguous group of the stator terminals energized with controlled relative phases and amplitudes. One rotor has a "serpentine" transmission line in which folded segments of different lengths intercouple contiguous rotor taps. In another rotor a sectorial plate including a dielectric element forms parallel plate transmission lines with fixed radial strips connected to the stator terminals to furnish the desired relative attenuation and phase displacement.

---

The present invention relates in general to scanning and more particularly concerns novel apparatus and techniques for exchanging electromagnetic energy with different contiguous groups of a number of terminals with controlled relative phase and/or amplitude. The invention is especially useful as a component for exchanging energy with radiating elements in an antenna system having fixed radiating elements, but nevertheless being capable of rapidly scanning with a sharply defined scanning aperture.

One example of a prior art phasing system for exchanging energy between a central terminal and a multiplicity of terminals adapted to be connected to individual antenna elements in an array with power supplied in controlled phase and amplitude is disclosed in U.S. Patent No. 3,145,352. That patent discloses a rotor carrying a tapped delay line in which the sizes of plates, such as 30 and 39 of FIG. 2 in the drawing and the cross sectional area of inner conductor 24, may be sized to suitably adjust the velocity of propagation and/or characteristic impedance per delay line section so as to achieve a desired phase and amplitude distribution along the path spanned by the delay line taps. This arrangement controls the phase and amplitude distribution of energy exchanged between the delay line and a contiguous group of the multiplicity of terminals.

Although this patented invention functions exceptionally well in many instances, it is difficult to achieve large incremental differences in delay between consecutive delay line sections. And achieving wide variations in delay per section in the prior art structure might cause the characteristic impedance of the tapped delay line to depart from a desired value to introduce mismatch or reduce the usable bandwidth of the system.

Accordingly, it is an important object of this invention to provide improved means for scanning a multiplicity of terminals so as to exchange energy with a contiguous group of the terminals and a central terminal while furnishing energy to the different terminals in the group with controlled relative phase.

It is another object of the invention to achieve the preceding object while having the capability of furnishing less delay between the central terminal and the center terminal of the contiguous group than between the central terminal and the extreme terminal of the contiguous group.

It is another object of the invention to achieve one or both of the preceding objects with an effectively tapped delay line capable of furnishing a relatively high incremental delay between the effective electrical paths between the central terminal and adjacent terminals in the contiguous group.

It is still a further object of the invention to provide means for matching the impedance at the central terminal to the delay furnishing means over a relatively wide frequency range.

SUMMARY OF THE INVENTION

According to the invention there are a multiplicity of spaced insulatedly separated scanned terminals. Terminal scanning means is provided for exchanging electromagnetic energy with a contiguous group of the scanned terminals and a central terminal while introducing a prescribed delay between the central terminal and each of the extreme ones of the scanned terminals in the contiguous group that is different from the delay furnished thereby between the central terminal and the central one of the contiguous group. The delay is usually such that radiating elements respectively coupled to the respective scanned terminals in the group coact with the apparatus to function as a radiating system characterized by high directionality of the system coupled to the central terminal.

According to one aspect of the invention the terminal scanning means comprises a dielectric lens. According to another aspect of the invention the terminal scanning means comprises a serpentine tapped transmission line.

Still another feature of the invention resides in spiral impedance matching means for coupling the central terminal to the terminal scanning means.

Numerous other features, objects and advantages of the invention will become apparent from the following specification when read in connection with the accompanying drawing in which:

BRIEF DESCRIPTION OF THE DRAWING

FIG. 3 is a pictorial representation of the scanner of FIGS. 1 and 2 when using a serpentine delay line;

FIG. 4 is a perspective view of a portion of the stator structure illustrating the cavity loading of each fixed terminal;

FIG. 5 is a sectional view through sections 5—5 of FIG. 4;

FIG. 6 is a schematic representation of the coupling provided between the serpentine delay line and the contiguous group of terminals loaded by respective cavities and radiating elements;

FIG. 7 is an internal view of the delay line of FIG. 2 when using the serpentine delay line according to the invention;

FIG. 8 is a detailed view of the scanner of FIG. 6 showing how the energy transfer area of the serpentine delay line and the delay per section changes from extremity to center;

FIG. 9 is a top view of a portion of the scanner shown in FIG. 7 illustrating one of the like halves of the serpentine delay line relative to the scanned terminals;

DETAILED DESCRIPTION OF PREFERRED EMBODIMENTS

Figure 1:
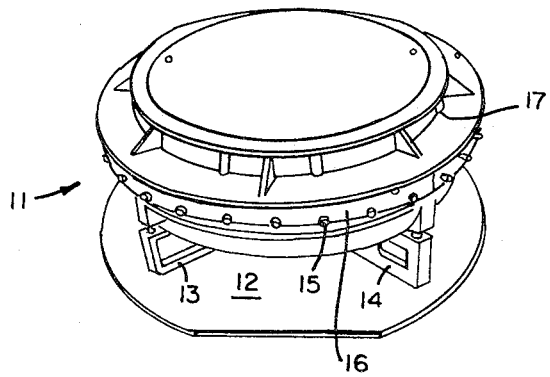
FIG. 1 is a perspective view of a delay line scanner according to the invention.

With reference now to the drawing and more particularly FIG. 1 thereof, there is shown an embodiment of the invention. The scanner 11 is shown seated upon a platform 12 by means including support mounts 13 and 14. A number of fixed circumferentially displaced scanned coaxial terminal pairs, such as 15, protrude from the circumferential wall 16 of the stator conductive casing surrounding the internal elements of scanner 11, this casing including the upper assembly 17.

Figure 2:
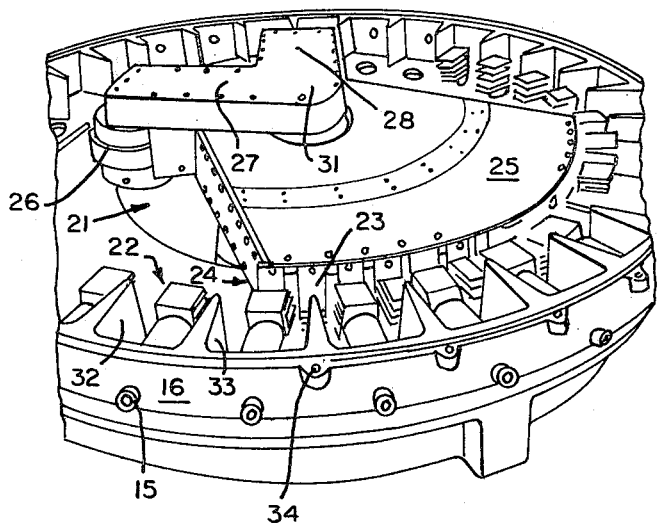
FIG. 2 is a perspective view of a portion of the interior of the structure of FIG. 1 illustrating the rotatable delay line.

Referring to FIG. 2, there is shown a perspective view of a portion of the inside of scanner 11 with upper assembly 17 removed. The rotor 21 comprises means for scanning the scanned terminal pairs and is rotatable about an axis of symmetry of the scanner 11. This is the axis of symmetry of the stator conductive casing and, hence, the circumferentially displaced coaxial terminal pairs, such as 15. The inner terminal of each fixed coaxial terminal pair is coupled to a group of radially extending plates, such as 22 arranged for dovetailing with similar groups of radially extending parallel plates, such as 23 associated with respective taps on the tapped delay line 24 so that when a group of rotor plates, such as 23, is fully meshed in a group of stator plates, such as 22 there is maximum coupling between the associated delay line tap and the associated coaxial inner terminal. The delay line 24 is shielded by means including a top plate 25 and fed at its ends by means including a clockwise impedance transformer 26 which in turn is energized by clockwise waveguide branch 27 and another counterclockwise impedance transformer (not visible in FIG. 2) fed by counterclockwise waveguide branch 28. Branches 27 and 28 converge into a common branch 31 embracing the axis of symmetry of scanner 11 which may also be the axis of a coaxial rotary joint (not shown) leading to a central terminal for coupling to external apparatus, such as a transmitter or receiver.

Conducting partitions such as 32 and 33 extend radially inward from the stator circumferential wall 16 and function to electrically isolate the group of parallel plates such as 22 from the others and comprise the outer conductor of a coaxial line coupling the stator plates to a fixed coaxial terminal pair. The partitions such as 32 and 33 extend radially inward, preferably as close as practical to the circle defined by the radially outwardmost tips of the rotor plates, such as 23, best seen in FIG. 9, without touching the rotor plates and sufficiently far from these plates so that arcing does not occur.

The top of circumferential wall 16 may be formed with a number of bolt openings, such as 34 to which upper assembly 17 may be securely bolted.

Referring to FIG. 3, there is shown a pictorial representation of a top view of the assembly shown in part in FIG. 2 with top plate 25 removed to expose the serpentine delay line having radially outwardmost peaks, such as 35 terminating in a group of conducting plates, such as 23. Branches 27 and 28 may comprise equal length signal strips 36 and 37, respectively, forming a V having a vertex 38 that is connected to the inner conductor of a coaxial rotary joint comprising common branch 31. The end of strip 36 may be connected to the input of clockwise transformer 26 and that of strip 37 to counterclockwise transformer 41. The output of clockwise transformer 26 may be connected to the clockwise feed branch 42 of serpentine delay line 24 while the output of counterclockwise transformer 41 may be coupled to the counterclockwise input branch 43 of serpentine delay line 24. Serpentine delay line 24 is shown symmetrical about the radial 44 passing through the central terminal of the contiguous group of terminals including extreme terminals 46 and 47, clockwise intermediate terminals 51 and 52 and counterclockwise intermediate terminals 53 and 54. For the illustrated embodiment shown there are 24 equiangular increments between adjacent fixed terminal pairs, and the rotor delay line 24 at any one instant exchanges energy with the fixed terminals embraced within six of these increments. If the geometric arrangement of the 24 radiating elements individually coupled to respective ones of the 24 fixed coaxial terminal pairs, such as 15, correspond to the geometric configuration in FIG. 3, then the maximum directivity of the system is along the line of direction 44 and rotates in synchronism with rotation of rotor 21. By selecting appropriate delays between consecutive taps, the scanning aperture of the system may be controlled. There are preferably more delay line taps in the angular sector spanned by the extreme taps of the rotor delay line than there are fixed terminals in that angle. Thus in the specific example there are 7 fixed terminal pairs and 19 delay line taps.

Referring to FIG. 4 there is shown a perspective view of a portion of the stator conductive casing illustrating the cavities, such as cavity 55, for loading the junction of the stator parallel plates, such as 22, and an inner conductor leading the inner terminal of coaxial terminal pair 15 with effective inductance. This arrangement is better seen in FIG. 5 which is a view through section 5—5 of FIG. 4. The inner terminal 61 of coaxial terminal pair 15 is part of a unitary structure having a sleeve portion 62 that snugly engages a dielectric sleeve 60 over rode 63 connected to parallel plates 22 to form a capacitor. Sleeve 62 is centrally located in the cavity between side walls such as 32 and 33 and upper assembly 17 and lower horizontal plate 64. Cavity 55 is basically a coaxial stub having a short circuiting element 65 and an inner conducting rod 66 joined to the junction of plate 24 and rod 63.

FIG. 5 also shows a view of rotor plates such as 23 meshed in stator plates 22. The equivalent circuit relationship will be better understood by referring to the schematic circuit diagram in FIG. 6. A portion of the serpentine delay line 30 is schematically represented from the central tap 71 to the tenth clockwise tap 81 with eight intermediate taps 72–79, respectively. Taps 71–80 are coupled to rotor parallel plates 81–90, respectively. Every third group of rotor plates is opposite a group of stator plates at a given relative position between rotor and stator. Thus in FIG. 6 rotor plates 81, 84, 87 and 90 are opposite stator plates 91, 92, 93 and 94, respectively, to effectively form variable capacitors therewith depending upon the extent of the dovetailing area between the plates. Each of the stator plates of groups 91, 92, 93 and 94 is coupled to a respective inner terminal of a coaxial terminal pair 95, 96, 97 and 98, respectively, by an effective fixed capacity 101, 102, 103 and 104, respectively, corresponding to the capacity between a rod like 63 and a sleeve like 62. Each of the inner terminals 95, 96, 97 and 98 is represented as being terminated in resistances 105, 106, 107 and 108, respectively, usually corresponding to the resistance presented at a coaxial terminal pair by the transmission line leading to a corresponding radiating element.

Referring to FIG. 7, there is shown a perspective view of a portion of the scanner diagrammatically represented in FIG. 3 to better illustrate the physical arrangement of the different elements in the rotor. Clockwise impedance matching transformer 41 may comprise a coiled strip transmission line as shown fed at the center of the helix thus formed. Serpentine delay line 24 is supported upon an arcuate plate 111 fastened to a radially extending support beam 112 and reinforced by ribs 113 and 114.

Referring to FIG. 8, there is shown an exploded view illustrating how serpentine delay line casing 115 may carry on its circumferential wall 116 most of the rotor plates associated with taps on the delay line while the plates associated with the taps nearest the center are connected to a base plate 117 that may be supported directly on arcuate plate 111. Note that the width of the central conducting portions of each fold of the serpentine delay line tapers inward to effectively vary the impedance between each tap and the associated group of rotor plates to couple less energy to the rotor plates at the ends of the serpentine delay line than to the taps nearer the center.

Referring to FIG. 9, there is shown a top view of a portion of the assembled serpentine delay line 24 with cover plate 25 removed illustrating the relationship of the assembled rotor components to stator components.

Figure 10:
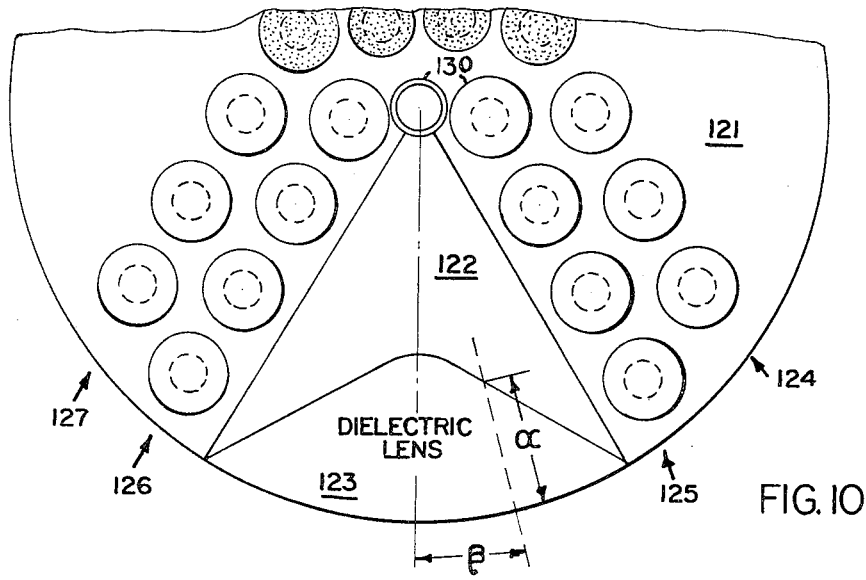
FIG. 10 is a top view of the rotor of an alternate delay line scanner in which the terminals for connection to external radiating elements are connected to respective conducting strips that are energized by delay means including a dielectric lens for establishing the desired phase and amplitude.
Figure 11:
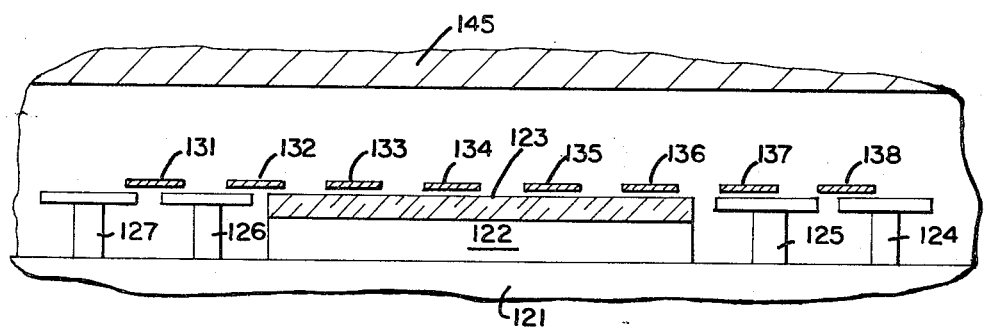
FIG. 11 is a partial circumferential sectional view through the alternate scanner.
Figure 12:
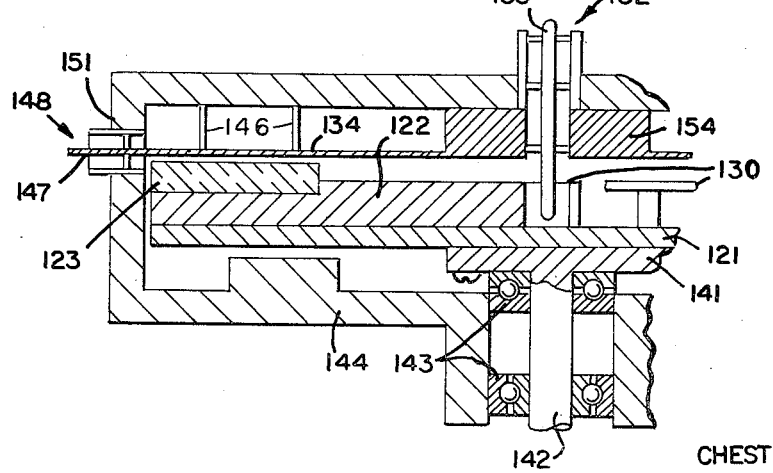
FIG. 12 is a partial diametrical sectional view of the alternate scanner through the fat portion of the lens.

Referring to FIGS. 10–12, there is illustrated another embodiment of the invention. Since the stator of this assembly is circularly symmetric and the rotor is essentially a rotating table with the lens and "toadstool" elements illustrated in FIGS. 10 and 11 substantially in an angular sector embracing the energy transmission path from the center, the views shown in FIGS. 10, 11 and 12 are believed best able to illustrate the invention.

FIG. 10 is a top view of the rotor. The rotor base plate 121 supports the sectoral raised platform 122 forming one plate of a parallel plate transmission line. The dielectric lens 123 is adjacent the circumferential edge of sectorial plate 122. Four rows of toadstool elements 124, 125, 126 and 127 are generally parallel to the bounding radii of sector plate 122 with individual toadstool elements staggered as indicated so that each toadstool element in rows 124 and 127 is centered at a radial distance midway between the radial distances of a contiguous pair of toadstool elements in rows 125 and 126. A conducting wall 130 defines a cylindrical cavity coaxial about the rotor axis. FIG. 11 is a view along a circumferential section of the scanner that embraces the circumference of the rotor looking radially inward to show the physical relationship of the rotor and stator elements. The inner terminal of each stator coaxial terminal pair is connected to a respective radial conducting strip such as one of strips 131–138. Strips 133–136 coact with sectoral plate 122 to form four parallel plate transmission lines coupling the central input along the rotor axis to the four respective stator coaxial terminal pairs with delays dependent upon the amount of dielectric lens material between sectoral plate 122 and a respective one of strips 133–136. Thus, the transmission lines comprising strips 134 and 135 furnish more delay than the transmission lines comprising strips 133 and 136. Rows 124, 125, 126 and 127 prevent appreciable energy from flowing outside the angle spanned by lens 123, the elements partially cutaway having a dissipative coating that helps suppress undesired modes.

In the specific embodiment illustrated, it is preferred that more delay be furnished along a radial path bisecting the sector being scanned than along other radial paths, the least delay being furnished along the radials defining the sector edges. At the same time it is preferred that more energy be delivered along the radial path bisecting the center than radial paths toward the edges. To this end dielectric lens 123 is furnished with a greater radial length in the center of the sector that gradually tapers towards zero along the edges. The total effective impedance along the radial path seems to be proportional to the ratio of nondielectric lens path length to dielectric path length; hence, this effective impedance is lower along the radial line bisecting the sector than radial lines further outward so that more energy is transferred along the former path than along the latter paths. By appropriately altering the geometry, virtually any desired relationship among phase and amplitude may be achieved.

The invention thus affords a means of using relatively simple structure to effect both amplitude and phase control.

Referring to FIG. 12, there is shown a partial diametrical sectional view of a lens scanner according to the invention. Rotor base plate 121 is mounted upon end plate 141 of shaft 142 rotatably supported by means including ball bearings 143 in the lower base 144 of the stator. Sectoral plate 122 is recessed to accommodate dielectric lens 123. Strip 134 is spaced from the top wall 145 of the stator by insulating spacers 146 and terminates in the inner terminal 147 of coaxial terminal pair 148 in stator circumferential wall 151. A common coaxial terminal pair 152 has its axis coincident with that of the scanner and includes an inner conductor 153 that extends beyond the stator hub 154 to probe feed the transmission line comprising sectoral plate 122. Preferably inner conductor 153 extends into the cup-shaped cavity defined by wall 130 which functions to inductively load the radially innermost point of the transmission line comprising sectoral plate 122 and help effect a good impedance match.

In the specific illustrated example, approximately five contiguous stator terminal pairs may be energized with appropriately phased energy. The physical structure is such that maximum delay occurs for energy traveling along a radial line bisecting sectoral plate 122 and lens 123 while corresponding less delay is furnished symmetrically along radial paths further away from this radial line of symmetry.

Figure 13:
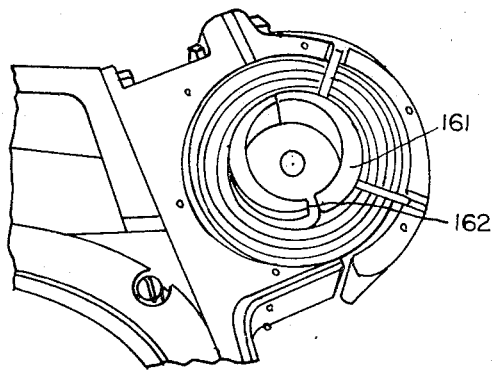
FIG. 13 is a perspective view of the coiled impedance transformer according to the invention.
Figure 14:
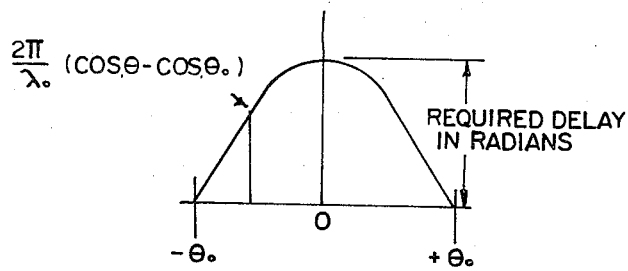
FIG. 14 is a graphical representation of the relationship between a typical delay function and the angular displacement of a stator terminal from the center of the group then being scanned.

Referring to FIG. 13, there is shown a more detailed view of the transformers 26 and 41. Each transformer comprises an inner cylindrical wall 161 fed by an axially located probe (not shown in FIG. 13) and an aperture 162 which winds around the axis of the transformer until the outermost portion is reached. Basically this transformer is a strip transmission line with varying dimensions chosen to approximate typically a 100 ohm characteristic impedance at the radially inward end, corresponding to the characteristic impedance of the associated branch line comprising a conducting strip 36 or 37, and 9 ohms at the output end, corresponding essentially to the characteristic impedance presented by branches 42 and 43 feeding the serpentine transmission line. Typically, the variable dimension is strip width and varied continuously Other dimensions could be varied, for example, separation. And the variations could be stepwise in quarter wavelength increments.

There have been described delay line and scanning means capable of establishing desired relative phase and/or amplitude relationships among signals exchanged with a common terminal and a selected group of scanned terminals while rapidly changing the group of terminals scanned with apparatus relatively compact, capable of operating at relatively high speeds with relatively little driving power while effecting efficient exchange of energy. It is apparent that those skilled in the art may now make numerous modifications and uses of and departures from the specific embodiments described herein without departing from the invented concepts. Consequently, the invention is to be construed as embracing each and every novel feature and novel combination of features present in or possessed by the apparatus and techniques herein disclosed and limited solely by the spirit and scope of the appended claims.

I claim:

1. Scanning apparatus comprising,
   a plurality of spaced insulatedly separated scanned terminals,
   a central terminal,
   terminal scanning means relatively movable with respect to said scanned terminals for exchanging electromagnetic energy between said central terminal and a contiguous group of said plurality,
   said terminal scanning means including means defining a parallel conductor transmission line for establishing both difference in delay and of amplitude between energy transmitted between said central terminal and a first terminal of said group and energy transmitted between said central terminal and a terminal of said group next to said first terminal, said parallel conductor transmission line comprising a folded serpentine delay line having continuously throughout its length, two line conductors of thin foil separated by a thin layer of dielectric.

2. Scanning apparatus in accordance with claim 1 wherein said parallel conductor transmission line comprises a serpentine delay line having folded parallel conductor transmission line lengths interconnecting consecutive taps associated with said terminal scanning means at least some of which taps are positioned physically in electrical coupling relationship to said group.

3. Scanning apparatus in accordance with claim 2 and further comprising means including first and second transmission line branches coupling said central terminal to respective extremities of said serpentine delay line to establish electrical pathlengths between said central terminal and each of said taps that progressively increases as the tap distance from the nearest of said extremities increases, the incremental increase between adjacent taps being primarily a function of the folded parallel conductor transmission line length therebetween.

4. Scanning apparatus in accordance with claim 3 and further comprising means associated with each of said taps for controlling the energy transferred between a said tap and said serpentine delay line to establish a predetermined ratio of energy exchange between each of said taps and said serpentine delay line.

5. Scanning apparatus in accordance with claim 4 wherein the energy exchange with each of said taps progressively increases as the tap distance from the nearest of said extremities increases, the incremental increase between adjacent taps being primarily a function of the characteristic impedance of the folded parallel conductor transmission line length therebetween.

6. Scanning apparatus in accordance with claim 3 wherein each of said first and second transmission line branches each include a coiled length of parallel conductor transmission line of varying impedance for matching the impedance at said central terminal to that at each of said extremities.

7. Scanning apparatus in accordance with claim 6 wherein said terminal scanning menas comprises a rotor rotatable about an axis embraced by said central terminal with said extremities and said group substantially subtending an angle from said axis to define a contemporarily illuminated sector, each of said coiled lengths of parallel conductor transmission lines being outside the latter sector and located mostly on the opposite side of a line perpendicular to said axis and the central radius of said sector, and further comprising respective conducting strips extending radially from said axis to the center of each of said coiled lengths connecting each of the latter to said central terminal.

8. Scanning apparatus in accordance with claim 7 and further comprising, respective sets of rotor tap plates coupled to each of said taps, respective sets of stator terminal plates coupled to each of said scanned terminals for dovetailing engagement with said sets of rotor tap plates, and associated with each set of stator terminal plates means defining a coaxial cavity connected to an associated stator terminal plate set.

9. Scanning apparatus in accordance with claim 8 and further comprising a first cylindrical conducting member connected to each set of stator terminal plates, and a second cylindrical conducting member connected to each stator terminal in coaxial insulatedly separated relationship with said first cylindrical conducting member.

10. Scanning apparatus in accordance with claim 9 wherein each of said scanned terminals is the inner terminal of a coaxial terminal pair whose outer terminal is conductively interconnected with the other outer terminals by means including means defining a stator casing having a circumferential wall about said axis and further comprising, conducting walls extending radially inward from said circumferential wall and separating adjacent pairs of first and second cylindrical conducting members the common axis of which is midway between adjacent ones of said conducting walls.

11. Scanning apparatus comprising, a plurality of spaced insulatedly separated scanned terminals, a central terminal, terminal scanning means relatively movable with respect to said scanned terminals for exchanging electromagnetic energy between said central terminal and a contiguous group of said plurality, terminal scanning means including structure relatively movable with respect to said scanned terminals for exchanging electromagnetic energy between said central terminal and a contiguous group of said plurality, said terminal scanning means including parallel conductor transmission line means for establishing both a difference in delay and of amplitude between energy transmitted between said central terminal and a first terminal of said group and energy transmitted between said central terminal and a terminal of said group next to said first terminal, said parallel conductor transmission line means comprising a sectorial conducting plate supporting a dielectric member along a portion thereof and conducting strips generally parallel to said sectorial plate each connected to a respective one of said scanned terminals and comprising means for establishing parallel energy transmission paths between said central terminal and said scanned terminals.

12. Scanning apparatus in accordance with claim 11 wherein said sectorial conducting plate is formed with a stepped portion where said dielectric portion resides and the separation between said sectorial plate and said conducting strips where said dielectric portion resides is greater than between said conducting strips and other portions of said sectorial plate, the height of said dielectric portion being slightly less than the separation between said sectorial plate and said conducting strips, the magnitude and phase of electrical energy transmitted along a path between said sectorial conducting plate and a one of said conducting strips being related to the volume of said dielectric material along said path.

13. Scanning apparatus in accordance with claim 12 wherein said volume increases as the distance from the nearest edge of said sectorial conducting plate increases.

14. Scanning apparatus in accordance with claim 13 and further comprising conducting elements generally parallel to the edges of said sectorial plate for substantially confining the flow of energy to occurring within the volume embraced by said sectorial conducting plate, said central terminal, said group and the conducting strips connected to said group.

15. Scanning apparatus in accordance with claim 14 wherein said conducting elements are toadstool-like and have caps defining a plane closely adjacent to the plane defined by said conducting strips.

16. Scanning apparatus in accordance with claim 15 wherein said terminal scanning means comprises a rotor rotatable about an axis embraced by said central terminal with the edges of said sectorial conducting plate and said group substantially subtending an angle from said axis to define a contemporarily illuminated sector and said conducting strips extend substantially radially from said axis.

17. Scanning apparatus in accordance with claim 16 wherein said scanned terminals are inner terminals of respective coaxial terminal pairs connected to respective ones of said strips and disposed within a circumferential conducting wall surrounding said axis and conductively interconnecting the outer terminals of each coaxial terminal pair.

References Cited

UNITED STATES PATENTS

| | | | |
|---|---|---|---|
| 2,935,705 | 5/1960 | Reis | 333—31 |
| 3,145,352 | 8/1964 | Russel | 333—31 XR |
| 3,408,654 | 10/1968 | Walker | 343—754 |

HERMAN KARL SAALBACH, Primary Examiner

MARVIN NUSSBAUM, Assistant Examiner

U.S. Cl. X.R.

333—31; 343—754